(12) United States Patent
Kim et al.

(10) Patent No.: US 7,328,003 B2
(45) Date of Patent: Feb. 5, 2008

(54) METHOD AND MOBILE COMMUNICATION SYSTEM FOR TRANSMITTING AND RECEIVING MULTIMEDIA MESSAGES

(75) Inventors: Jin-Woong Kim, Suwon-shi (KR); Do-Hun Kwon, Yongin-shi (KR)

(73) Assignee: Samsung Electronics., Ltd. (KR)

( * ) Notice: Subject to any disclaimer, the term of this patent is extended or adjusted under 35 U.S.C. 154(b) by 139 days.

(21) Appl. No.: 10/725,781

(22) Filed: Dec. 2, 2003

(65) Prior Publication Data

US 2004/0110492 A1 Jun. 10, 2004

(30) Foreign Application Priority Data

Dec. 2, 2002 (KR) ...................... 10-2002-0075854

(51) Int. Cl.
*H04M 11/00* (2006.01)
(52) U.S. Cl. .............................. 455/412.1; 455/414.1; 709/206; 709/246
(58) Field of Classification Search ............... 455/466, 455/414.1, 414.3, 412.2, 412.1; 379/88.12, 379/93.24, 100.06, 100.08; 709/206, 246; 358/402
See application file for complete search history.

(56) References Cited

U.S. PATENT DOCUMENTS 5,889,839 A * 3/1999 Beyda et al. ............. 379/88.12

2002/0116465 A1 * 8/2002 Kim et al. ................... 709/206
2003/0028604 A1 * 2/2003 Aktas et al. ................. 709/206
2004/0203606 A1 * 10/2004 Souissi et al. ........... 455/412.1

FOREIGN PATENT DOCUMENTS

| CN | 1377201 | 10/2002 |
|---|---|---|
| EP | 0 785 661 | 7/1997 |
| EP | 1 091 601 | 4/2001 |
| WO | WO 99/65256 | 12/1999 |
| WO | WO 01/33782 | 5/2001 |
| WO | WO 01/33803 | 5/2001 |
| WO | WO 01/35622 | 5/2001 |

OTHER PUBLICATIONS

European Search Report dated Apr. 5, 2004 issued in a counterpart application, namely, Appln. No. 03027744.6.

* cited by examiner

*Primary Examiner*—Jean Gelin
*Assistant Examiner*—Michael Vu
(74) *Attorney, Agent, or Firm*—The Farrell Law Firm, PC

(57) ABSTRACT

A method and a mobile communication system for transmitting/receiving a multimedia message using a mobile communication terminal. Summarized data type information representing a kind of each of data types constituting a multimedia message, which is to be received by a network, and data type information summarizing the details of each of the data types are first transmitted to the receiving mobile terminal. This allows a receiving communication terminal to selectively receive data types of a multimedia message according to a selection of the receiving terminal's user.

3 Claims, 4 Drawing Sheets

METHOD AND MOBILE COMMUNICATION SYSTEM FOR TRANSMITTING AND RECEIVING MULTIMEDIA MESSAGES

PRIORITY

This application claims priority to an application entitled "METHOD AND MOBILE COMMUNICATION SYSTEM FOR TRANSMITTING/RECEIVING MULTIMEDIA MESSAGES", filed in the Korean Industrial Property Office on Dec. 2, 2002 and assigned Serial No. 2002-75854, the data types of which are hereby incorporated by reference.

BACKGROUND OF THE INVENTION

1. Field of the Invention

The present invention relates generally to a wireless data communication, and more particularly to a method and a mobile communication system for transmitting/receiving multimedia messages using a mobile communication terminal.

2. Description of the Related Art

In line with the worldwide popularization of mobile communication services, such mobile communication services currently extend their service provision range from a voice service to a data service. The data service started as a service of providing simple information through a short message, and, recently, a data service for transmitting a multimedia message containing a large quantity of text information, still and animated images, and music files has been provided.

In a mobile communication system, multimedia message services are generally provided through an LME (Long Message Entity), which is a server for temporarily storing data, an LMSC (Long Message Service Center), which is a system for message transmission, and a general SMSC (Short Message Service Center). The transmission of multimedia messages is performed so that a multimedia message is generated by a transmitting mobile communication terminal, transmitted to the LMSC through a wireless network, and then stored in the LME. The LMSC notifies a receiving mobile communication terminal of the receipt of the multimedia message, and the receiving terminal receives the multimedia message by accessing the LMSC through a wireless network.

The transmitting mobile communication terminal generates a multimedia message by producing one message, as illustrated in FIG. 2, that incorporates various data types in the binary form such as text data (a character), sound data (a voice), and image data (a photograph or picture). Thereafter, as needed, the LME converts the multimedia message to a form suitable for the model of the receiving terminal, and stores it. The receiving mobile communication terminal is notified of the receipt of the multimedia message, and, as requested, the received multimedia message is transmitted to the receiving terminal. The receiving terminal displays the received multimedia message by decoding it pursuant to a predetermined standard.

As described above, the multimedia message is encoded in the form of a single message as illustrated in FIG. 2, and then stored in the LME. Thus, the receiving terminal receives all data types contained in the multimedia message even though a user may require only one of the data types, e.g. text data. For the same reason, when the user is charged for data types contained in the multimedia message, the user will incur unnecessary charges. Further, in consideration of a relatively large size of the multimedia message, receiving and decoding all the data types in the message for confirmation of the message results in an inconvenience to the user, and increase in battery consumption.

SUMMARY OF THE INVENTION

Therefore, the present invention has been designed in view of the above problem, and it is an object of the present invention to provide a method and a mobile communication system for transmitting/receiving multimedia messages using a mobile communication terminal, which enable the mobile communication terminal to selectively receive desired data types of a multimedia message.

In accordance with one aspect of the present invention, the above and other objects are accomplished by a method for transmitting/receiving a multimedia message in a mobile communication system, the method comprising the steps of:

receiving summarized information on a plurality of data types included in the multimedia message from the mobile communication system and providing the received summarized data type information;

requesting multimedia data corresponding to at least one of a data type according to a user's selection; and receiving the multimedia data in response to the request.

In accordance with another aspect of the present invention, there is provided a mobile communication system for transmitting/receiving a multimedia message, the system comprising:

an LME (Long Message Entity) for receiving a multimedia message including a plurality of data types from a terminal, storing the received multimedia message while separately storing the data types, transmitting basic data type information which includes basic information of each of the data types, and, upon receipt of a request for multimedia data, transmitting multimedia data of a data type corresponding to the request;

an LMSC (Long Message Service Center) for producing and transmitting summarized multimedia information, which includes information of the kind of each of the data types and the number of each kind of data types, upon receipt of a response message from a terminal, producing and transmitting multimedia information, which includes detailed information of each of the data types, based on the basic multimedia information, and transmitting the terminal's request for a multimedia data to the LME; and a terminal for transmitting a corresponding response message upon receipt of the summarized multimedia information, receiving the basic multimedia information, and requesting multimedia data corresponding to a data type selected by a user.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may make the subject matter of the present invention rather unclear.

In the present invention, summarized data type information representing the kind of each of data types constituting a multimedia message, which is to be received by a network, and data type information summarizing the details of each of the data types are firstly transmitted to the receiving mobile terminal. This allows a receiving communication terminal to selectively receive data types of a multimedia message according to a selection of the receiving terminal's user.

Figure 1:
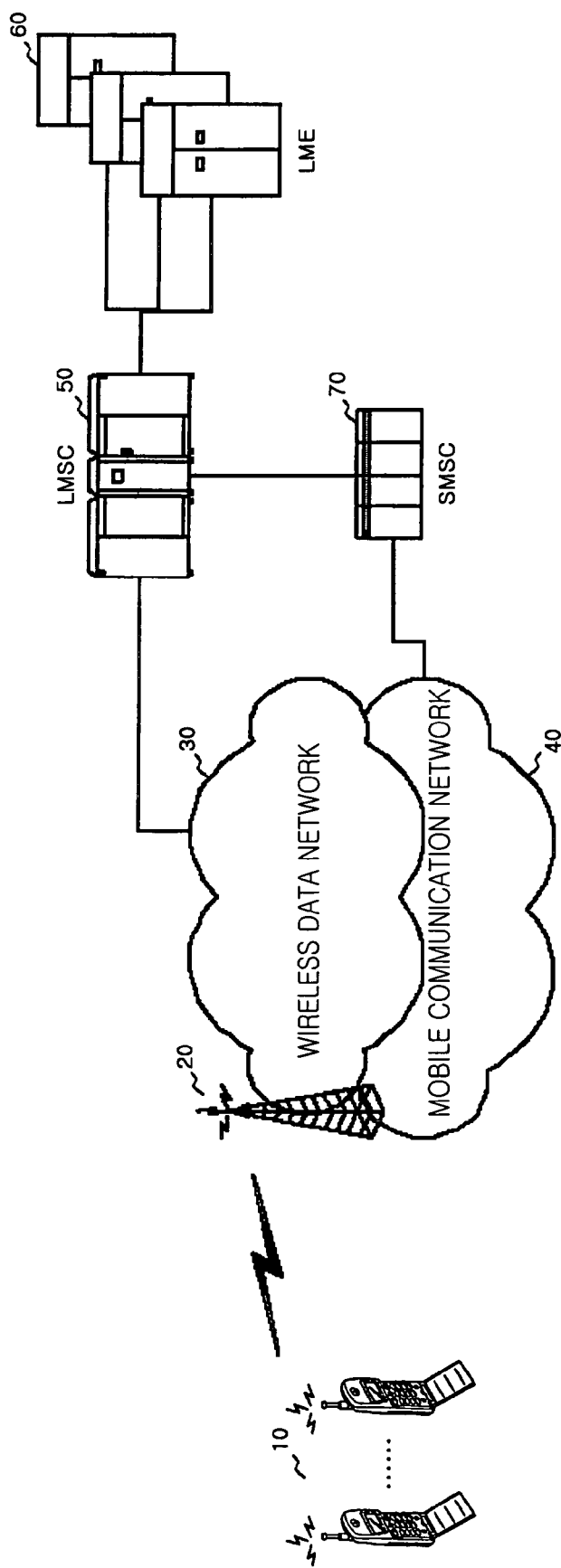
FIG. 1 illustrates a conventional mobile communication system to which the present invention is applied.
Figure 2:
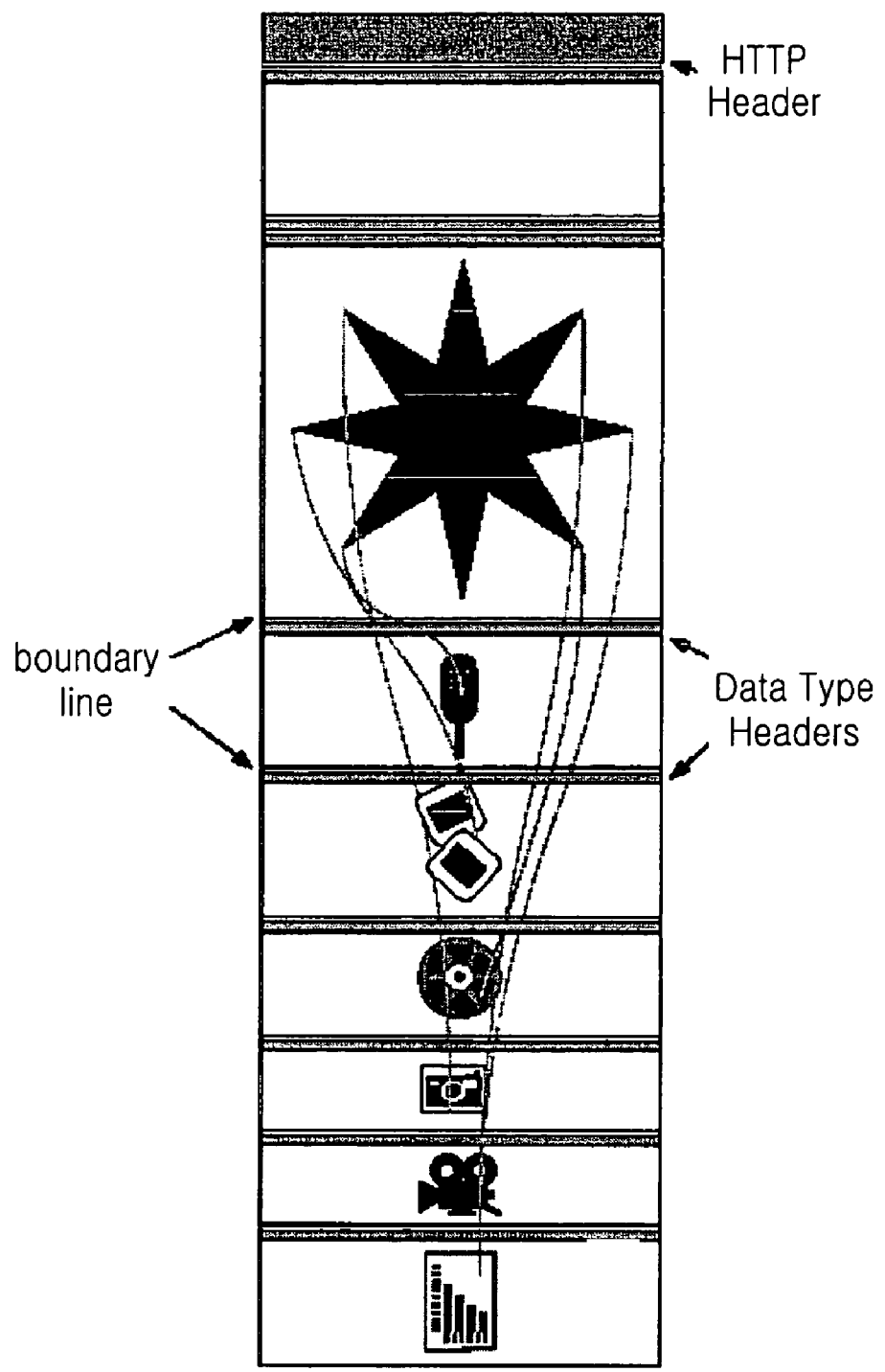
FIG. 2 illustrates a graphical display of a configuration of a multimedia message including data-type headers and boundary lines according to an embodiment of the present invention.

FIG. 1 illustrates a conventional mobile communication system to which the present invention is applied. As illustrated in FIG. 1, the mobile communication system comprises a mobile communication terminal (hereinafter, also referred to as "a terminal") 10, a base station 20, a wireless data network 30, a mobile communication network 40, an LMSC (Long Message Service Center) 50, an LME (Long Message Entity) 60, and an SMSC (Short Message Service Center) 70. The wireless data network 30 provides wireless data services to the terminal 10, in cooperation with the mobile communication network 40. The mobile communication network 40 provides mobile communication services, such as a basic call service to the terminal 10. According to an embodiment of the present invention, the terminal 10 produces a multimedia message and transmits it to the LMSC 50 through the wireless data network 30, or requests a receipt of a multimedia message stored in the LME 60. The multimedia message includes data types, such as text data, sound data, image data, and animated message data. FIG. 2 illustrates a configuration of a multimedia message according to the embodiment of the present invention. The LME 60 stores a multimedia message received from a terminal. In addition, according to the embodiment of the present invention, basic data type information, which includes the number, kind, size, and details of data types included in the stored multimedia message is obtained and the obtained basic data type information is transmitted to the LMSC 50.

In response to a request from a terminal, the multimedia message is at least partly transmitted to the terminal through the LMSC 50. According to a terminal's request of transmitting and receiving a multimedia message, the LMSC 50 manages the transmission of multimedia messages in cooperation with the wireless data network 30 and the mobile communication network 40.

According to the embodiment of the present invention, based on the basic data type information received from the LME 60, the LMSC 50 forms summarized data type information which includes the kind of each of data types stored in the LME 60 and information on the number of each kind of data types, and transmits the formed summarized data type information to the SMSC 70. For example, information on the kind of each of the data types can be described as 2 images, 1 moving image, and 33 MP3 files. In addition, when the LMSC 50 receives a request of providing a multimedia message from the receiving terminal, the LMSC 50 forms detailed information of each of the data types included in the multimedia message, which is called "data type information", and includes the size and billing information of each data type, and an icon representing details of each data type and the LMSC 50 transmits the formed data type information to the receiving terminal. As a center for managing short message transmissions, the SMSC 70 converts summarized data type information received from the LMSC 50 to a short message and transmits it to the receiving terminal.

Herein below, a procedure for receiving and transmitting multimedia messages in a mobile communication system according to the present invention will be described.

A transmitting terminal forms a multimedia message in a single message format as illustrated in FIG. 2, and transmits it to the LME 60. The LME 60 receives the multimedia message and stores in such a manner that the data types included in the multimedia message are separately stored. Thereafter, a message receipt notification message including summarized data type information that contains basic information on each of the data types is transmitted to a receiving terminal. The summarized data type information contains the kind of each of the corresponding multimedia data and the number of each kind of data types.

Upon receipt of the message receipt notification message, the receiving terminal determines whether or not to receive each of the data types referring to the summarized data type information, and transmits a response message to the LME 60. Thereafter, the receiving terminal accesses the LMSC 50 through the wireless Internet network to receive a text and data type information from the LME 60. The data type information includes concerned information such as the kind, size, and charges of the corresponding multimedia data. The receiving terminal reproduces the message in the same form as it was transmitted from the transmitting terminal, wherein it is expressed in such a manner that image icons having the same size are displayed at positions to be occupied by multimedia information. In addition, the receiving terminal provides an interface, which enables a user to select remaining multimedia messages, which are not yet downloaded, that the user wants to receive, i.e., which enables the user to determine whether or not to receive each of the remaining multimedia messages.

The receiving terminal waits for a selection by the user, and then, if a selection is entered, it transmits information on the selection to the server. When there is no selection, this result is transmitted to the server to terminate the wireless Internet connection. When the wireless Internet connection is terminated, the receiving terminal reconstructs a multimedia message by incorporating the received multimedia data and then displays it to the user. On the other hand, upon receipt of the selection information, the LME 60 sequentially transmits selected ones among data types of the multimedia message, which are separately stored in the LME 60, to the receiving terminal, and when the transmission is completed, the connection is terminated.

Figure 3:
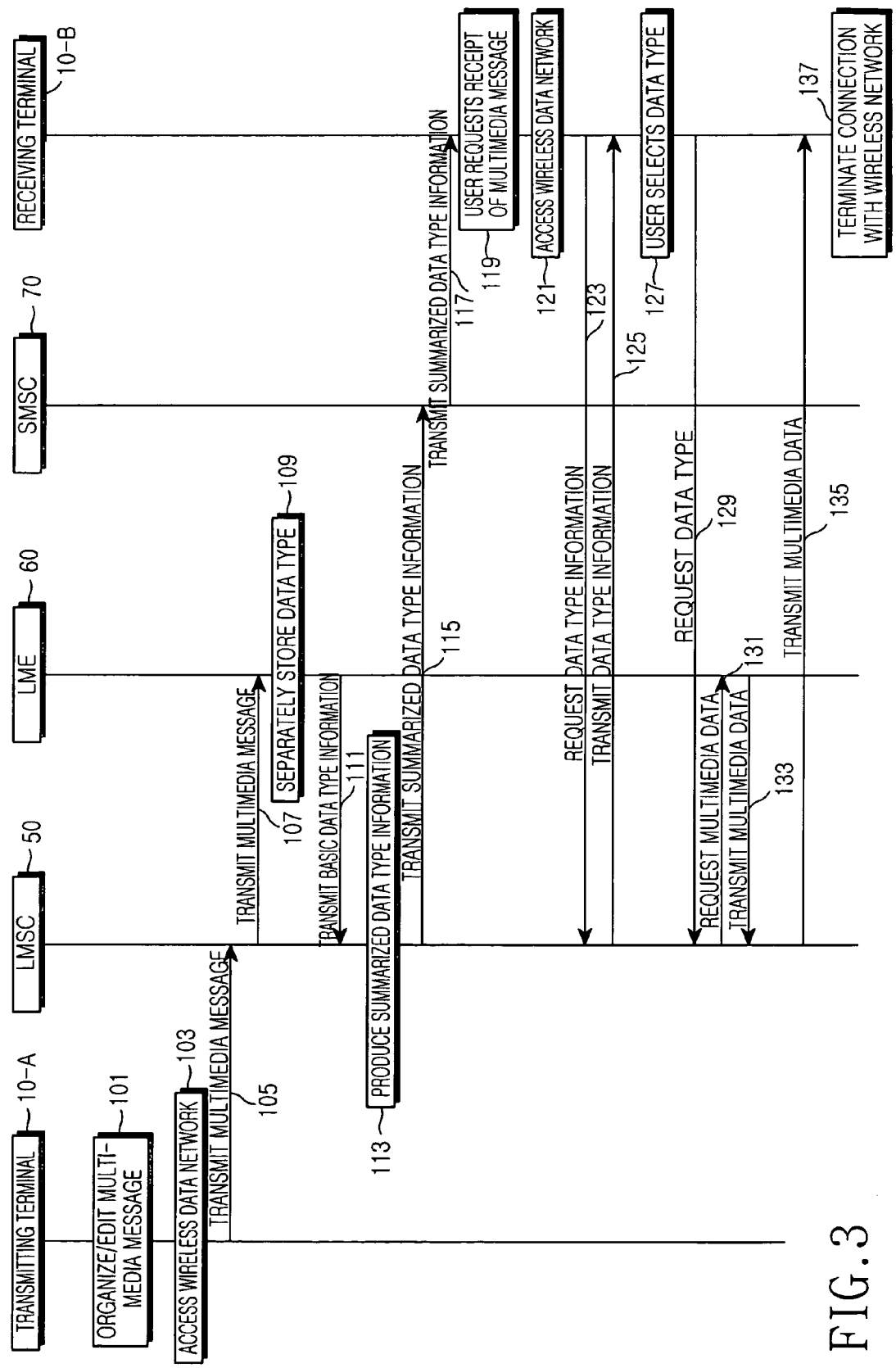
FIG. 3 illustrates message flows according to the embodiment of the present invention.

FIG. 3 illustrates message flow between elements in a procedure according to the embodiment of the present invention. As illustrated in FIG. 3, in step 101, a transmitting terminal 10-A organizes/edits a multimedia message according to a user's request. In step 103, the transmitting terminal 10-A accesses a wireless data network 30. In step 105, the transmitting terminal 10-A transmits the multimedia message produced in step 101 to the LMSC 50 through the wireless data network 30, and terminates the connection with the wireless data network 30 when the transmission is finished.

In step 107, the LMSC 50 transmits the received multimedia message to the LME 60. In step 109, the LME 60 stores the received multimedia message while separately storing the data types and generates basic data type information. In step 111, the LME 60 transmits the basic data type information to the LMSC 50. In step 113, the LMSC 50 generates summarized data type information using the received basic data type information. In step 115, the LMSC 50 transmits the basic data type information to the SMSC 70.

In step 117, the SMSC 70 generates a signal receipt notification short message including the received summarized data type information and transmits it to the receiving terminal 10-B. In step 119, the receiving terminal 10-B displays the received summarized data type information, and if a user requests a receipt of a multimedia message, the procedure moves to step 121. In step 121, the receiving terminal 10-B accesses the wireless data network 30. In step 123, the receiving terminal 10-B transmits a response message to request data type information from the LMSC 50. In response to this request, the LMSC 50 produces data type information based on the basic data type information, and transmits it to the receiving terminal 10-B in step 125. In step 127, the receiving terminal 10-B displays the received data type information and selects a data type according to the user's selection.

In step 129, the receiving terminal 10-B requests the selected data type from the LMSC 50. In step 131, the LMSC 50 requests multimedia data corresponding to the requested data type from the LME 60. In step 133, in response to this request from the LMSC 50, the LME 60 transmits corresponding multimedia data to the LMSC 50. In step 135, the LMSC 50 transmits the multimedia data (i.e., multimedia message) to the receiving terminal 10-B. When the receipt of the multimedia message is completed, the receiving terminal 10-B terminates the connection with the wireless data network 30 in step 137.

Figure 4:
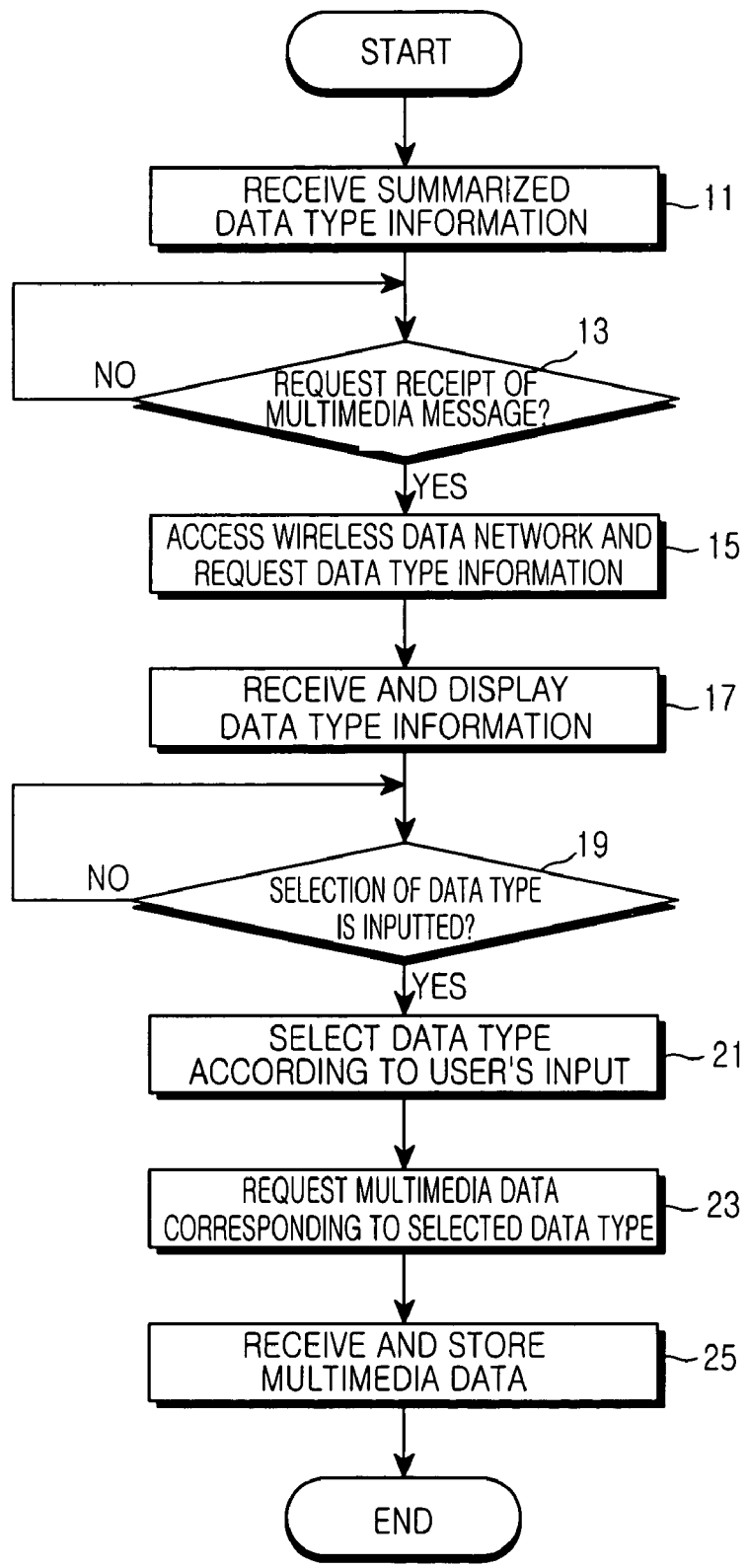
FIG. 4 is a flowchart illustrating an operation of a mobile communication terminal according to the embodiment of the present invention.

FIG. 4 is a flowchart illustrating an operation of the receiving terminal 10-B in such a method for transmitting/receiving multimedia messages according to the embodiment of the present invention. Referring to FIG. 4, in step 11, the receiving terminal 10-B receives summarized data type information from the SMSC 70 and displays it. When a communication key is inputted, the receiving terminal 10-B accesses the wireless data network 30 and the terminal's operation is set to make it possible to request a receipt of data type information. The user refers to displayed summarized data type information, and inputs the communication key when the user wants to receive corresponding multimedia message.

In step 13, the receiving terminal 10-B determines if the user requests a receipt of the multimedia message, i.e., the terminal confirms whether the communication key is input, and the procedure moves to step 15 when the receipt of the multimedia message is requested. In step 15, the receiving terminal 10-B accesses the wireless data network 20 and transmits a response message to the LMSC 50 to request a receipt of data type information. Thereafter, in step 17, the receiving terminal 10-B displays the data type information received from the LMSC 50. The displayed data type information includes the size, billing information, and icon representing detailed information of each of the data types. A selection of each of the data types is performed by the user's key operation. The receiving terminal 10-B is set with a user interface, which enables the user to request multimedia data corresponding to the selected data type. Thereafter, in step 19, the receiving terminal 110-B confirms whether the user inputs a key for selecting a data type, and, if so, the procedure moves to step 21. In step 21, the receiving terminal 10-B selects the data type according to the user's key input. In step 23, the receiving terminal 10-B requests multimedia data corresponding to the selected data type from the LMSC 50. In step 25, the receiving terminal 10-B receives and stores the requested multimedia data (i.e., multimedia message), and then terminates the operation.

As is apparent from the description above, in the present invention, a terminal selectively receives data types of a multimedia message. That is, in the present invention, summarized data type information representing the kind of each of data types constituting a multimedia message, which is to be received by a network, and data type information summarizing the details of each of the data types are first transmitted to the receiving mobile terminal. This allows a receiving communication terminal to selectively receive data types of a multimedia message according to a selection of the receiving terminal's user. Thus, the present invention has advantages in that the user's convenience is increased, and the user can avoid paying the charges for unwanted data, while enabling an efficient use of the terminal's memory.

Although preferred embodiments of the present invention have been disclosed for illustrative purposes, those skilled in the art will appreciate that various modifications, additions and substitutions are possible, without departing from the scope and spirit of the invention. Accordingly, the scope of the present invention should not be limited to the description of the embodiment, but defined by the accompanying claims as well as equivalents thereof.

What is claimed is:

1. A method for transmitting and receiving a multimedia message in a mobile communication system, the method comprising the steps of:

receiving in the mobile communication system a multimedia message including a plurality of data types from a terminal;

storing the received multimedia message while separately storing the data types;

producing summarized multimedia information, which includes information on a kind of each of the data types and a number of each kind of data types;

transmitting the summarized multimedia information in a signal receipt notification message;

upon receiving the signal receipt notification message in a terminal, providing the signal receipt notification message to a user, and transmitting a response message according to a selection by the user;

upon receipt of the response message by the mobile communication system, producing and transmitting multimedia information;

upon receiving the multimedia information by the terminal, providing the multimedia information to the user, and requesting multimedia data corresponding to a data type selected by the user; and transmitting the corresponding multimedia data from the mobile communication system to the terminal in response to the request from the terminal.

2. A mobile communication system for transmitting and receiving a multimedia message, the system comprising:

an LME (Long Message Entity) for receiving a multimedia message including a plurality of data types from a first terminal, storing the received multimedia message while separately storing the data types, transmitting basic data type information and, upon receiving a request for multimedia data from a second terminal, transmitting multimedia data of a data type corresponding to the request; and an LMSC (Long Message Service Center) for producing and transmitting summarized multimedia information, which includes information of a kind of each of the data types and a number of each kind of data types, to the second terminal, upon receiving a response message from the second terminal, producing and transmitting multimedia information, and transmitting the request for multimedia data from the second terminal to the LME;

wherein the second terminal transmits a corresponding response message upon receipt of the summarized multimedia information, receives the multimedia information, and requests multimedia data corresponding to a data type selected by a user.

3. A method for transmitting and receiving a multimedia message in a mobile communication system, the method comprising the steps of:

receiving a multimedia message including a plurality of data types from a terminal, storing the received multimedia message while separately storing the data types, and transmitting basic data type information, in an LME (Long Message Entity);

producing summarized multimedia information, which includes information of a kind of each of the data types and a number of each kind of data types, in an LMSC (Long Message Service Center);

transmitting a signal receipt notification message which includes the summarized multimedia information, in an SMSC (Short Message Service Center);

receiving the signal receipt notification message, providing the summarized and multimedia information to a user, and transmitting a response message according to a selection by the user, in a receiving terminal;

wherein the LMSC produces multimedia information, upon receipt of the response message;

wherein the receiving terminal receives multimedia information, provides the multimedia information to the user, and requests multimedia data corresponding to a data type selected by the user;

wherein the LMSC receives the corresponding multimedia data from the LME in response to the request, and transmits the corresponding multimedia data to the receiving terminal.

* * * * *